United States Patent [19]

Forsythe et al.

[11] Patent Number: 5,287,841
[45] Date of Patent: Feb. 22, 1994

[54] FLOW DIVIDER AND UTILIZATION SYSTEM

[75] Inventors: Alan K. Forsythe, Vashon; John M. Morris, Auburn, both of Wash.

[73] Assignee: GT Development Corporation, Tukwila, Wash.

[21] Appl. No.: 59,119

[22] Filed: May 7, 1993

[51] Int. Cl.⁵ ............................................. F02M 37/04
[52] U.S. Cl. ................................... 123/510; 137/118; 137/512.5; 137/883; 123/514
[58] Field of Search .................... 123/514, 510, 509; 137/118, 512.4, 512.5, 513, 883, 875, 878, 862

[56] References Cited

U.S. PATENT DOCUMENTS

| | | | |
|---|---|---|---|
| 1,173,703 | 2/1916 | Benkert | 137/512.5 |
| 1,780,121 | 10/1930 | Dunning | 137/512.5 |
| 2,161,813 | 6/1939 | Groeniger | 137/513 |
| 2,494,461 | 11/1950 | Trevaskis | 137/513 |
| 2,676,603 | 4/1954 | Kollsman | 137/118 |
| 2,777,466 | 1/1957 | Ericson | 137/862 |
| 3,538,946 | 11/1970 | Hilsheimer | 137/512.5 |
| 3,677,611 | 7/1992 | Urieno | 137/118 |
| 3,831,628 | 8/1974 | Kintner | 137/512.5 |
| 4,005,726 | 2/1977 | Fowler | 137/513 |
| 4,036,194 | 7/1977 | Kobayashi | 137/118 |
| 4,037,617 | 7/1977 | Perales | 137/512.4 |
| 4,276,237 | 6/1981 | Barker | 137/883 |
| 4,536,104 | 8/1985 | Büngert | 137/883 |
| 4,552,181 | 11/1985 | Hawkins | 137/883 |
| 4,860,714 | 8/1989 | Bucci | 123/514 |
| 5,109,822 | 5/1992 | Martin | 137/883 |

Primary Examiner—Carl S. Miller
Attorney, Agent, or Firm—Delbert J. Barnard

[57] ABSTRACT

A flow divider (20) is located between a first fuel return line (18), leading from an engine to the flow divider (20), a second fuel return line (22) leading from a first flow divider outlet (46) to a first tank (A), and a third fuel return conduit (24) leading from a second flow divider outlet (48) to a second tank (B). Returned fuel enters the flow divider inlet (34) and flows into an inlet chamber (54). The fuel flows from the inlet chamber (54) through first and second orifices (50, 52). The first orifice (50) is in flow alignment with a first outlet (42). The second orifice (52) is in flow alignment with a second outlet (44). A first closure member (86) is located in a first outlet opening (104) and a second closure member (88) is located in a second outlet opening (106). The closure members (86, 88) are connected to a common member (90). A spring (82) normally biases the closure members (86, 88) towards the orifices (50, 52). Fuel pressure in the inlet chamber (54) exerts forces on the closure members (86, 88), moving them away from the orifices (50, 52) against the force of the spring (82). The closure members (86, 88) will move substantially equal amounts even if forces acting on the closure members (86, 88) are unequal. This is because the two closure members (86, 88) are connected to a common member (90).

23 Claims, 10 Drawing Sheets

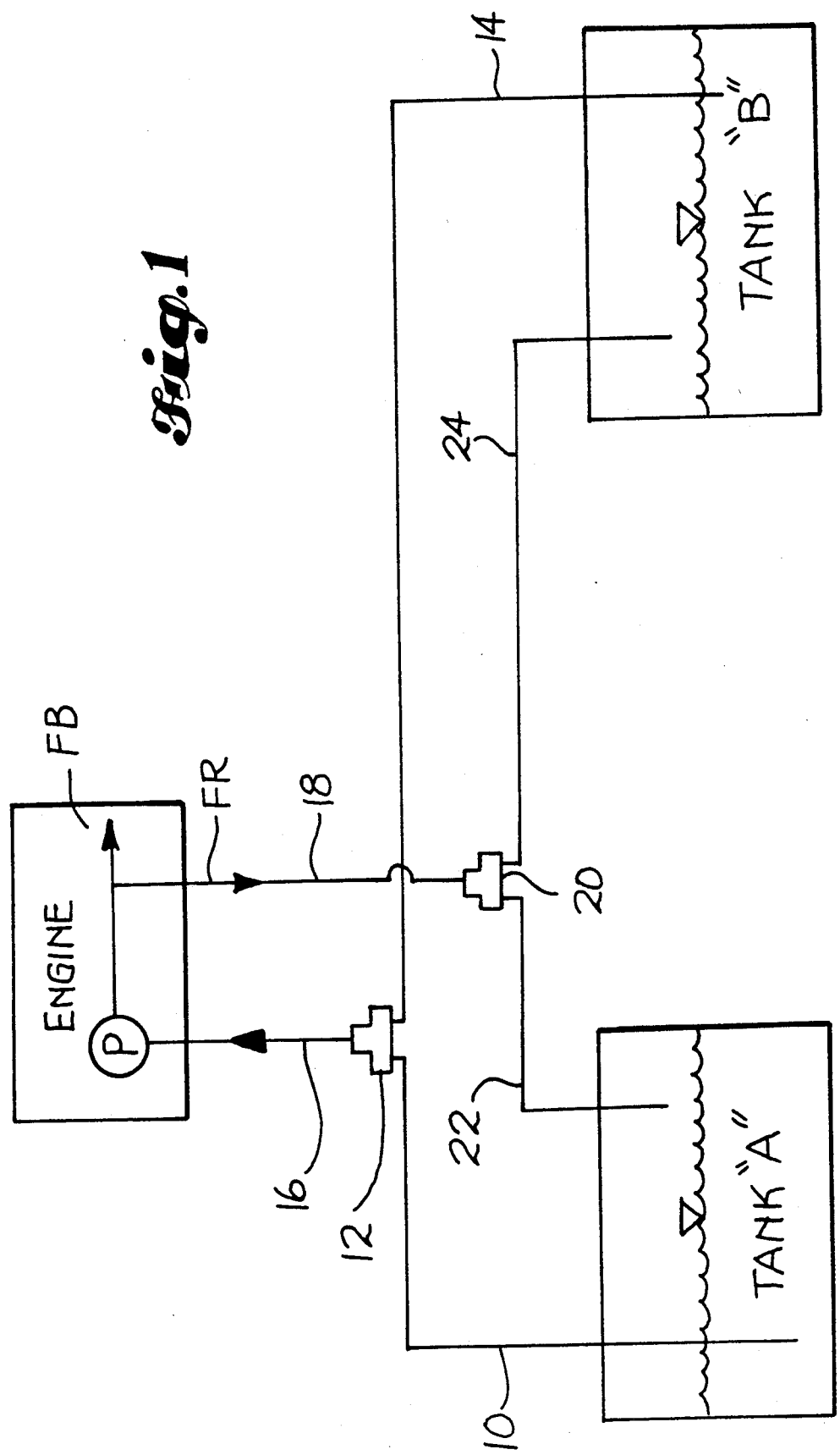

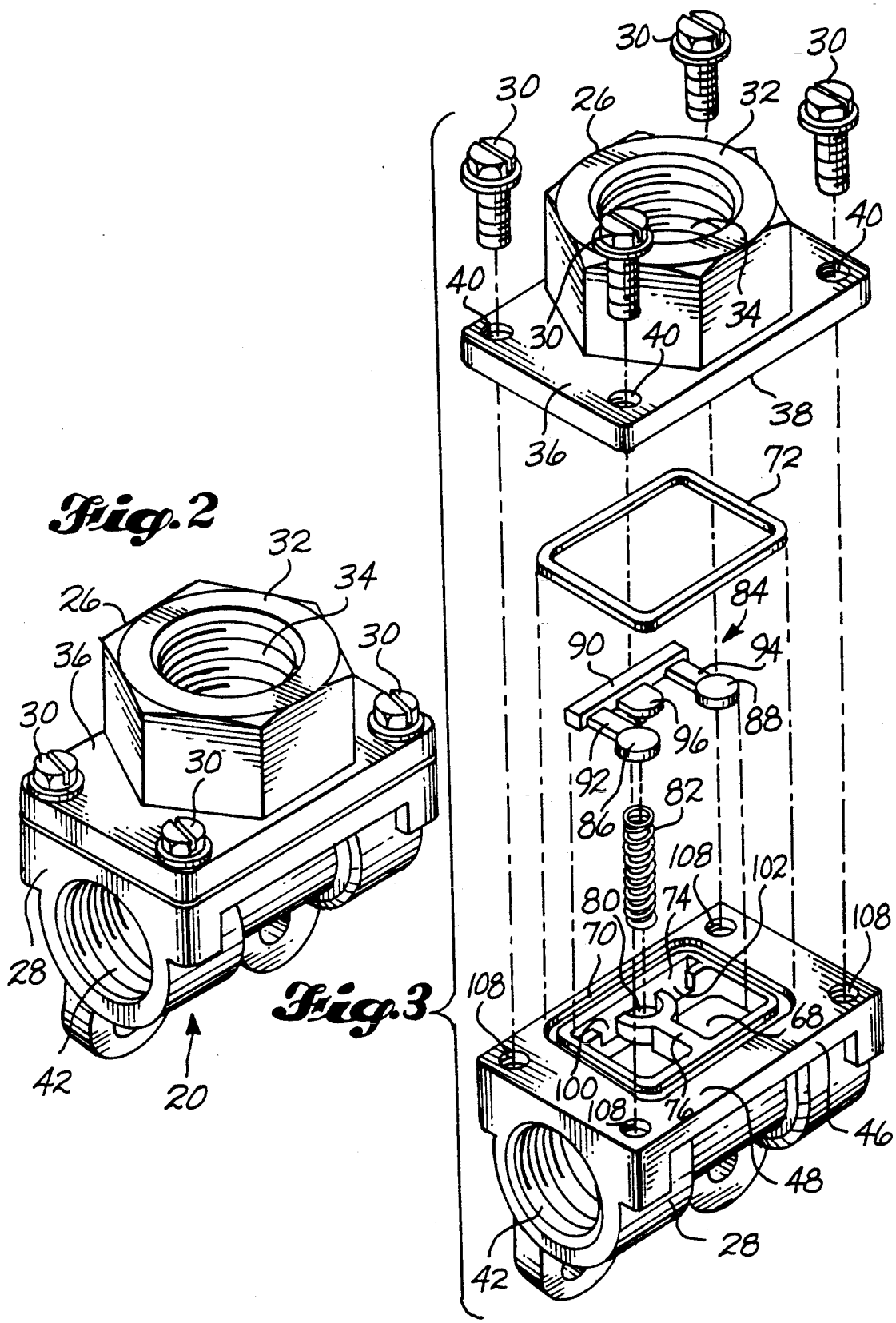

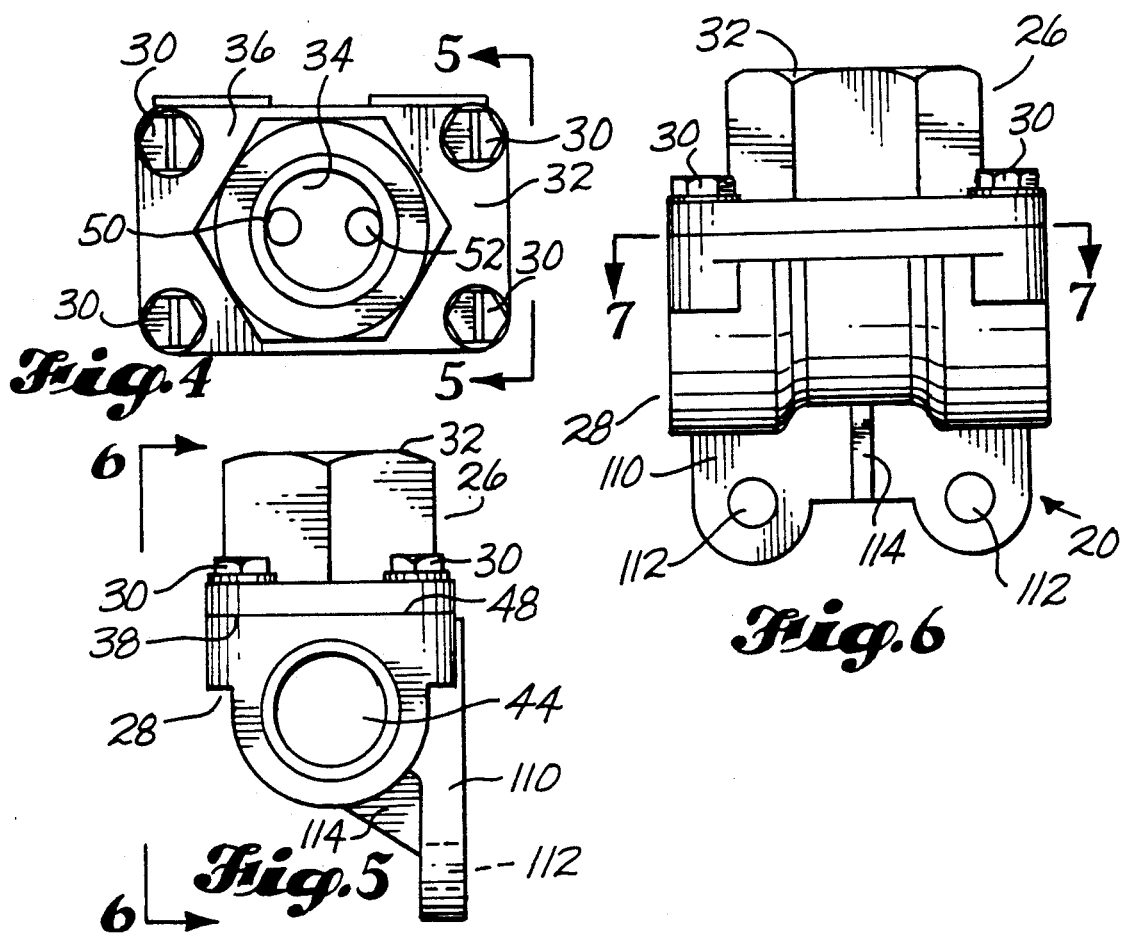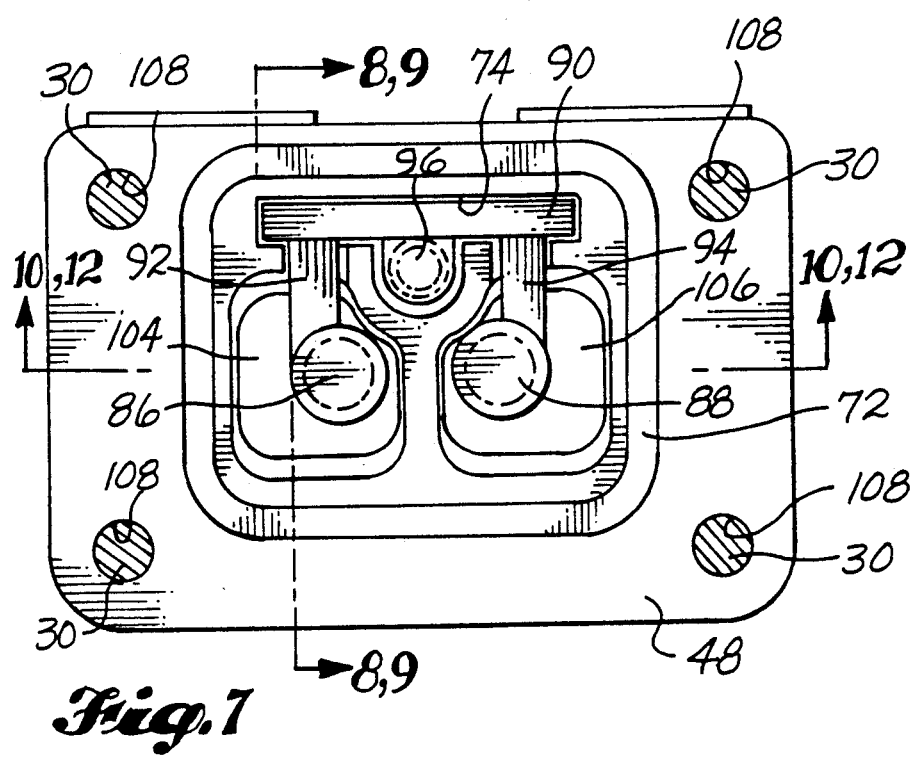

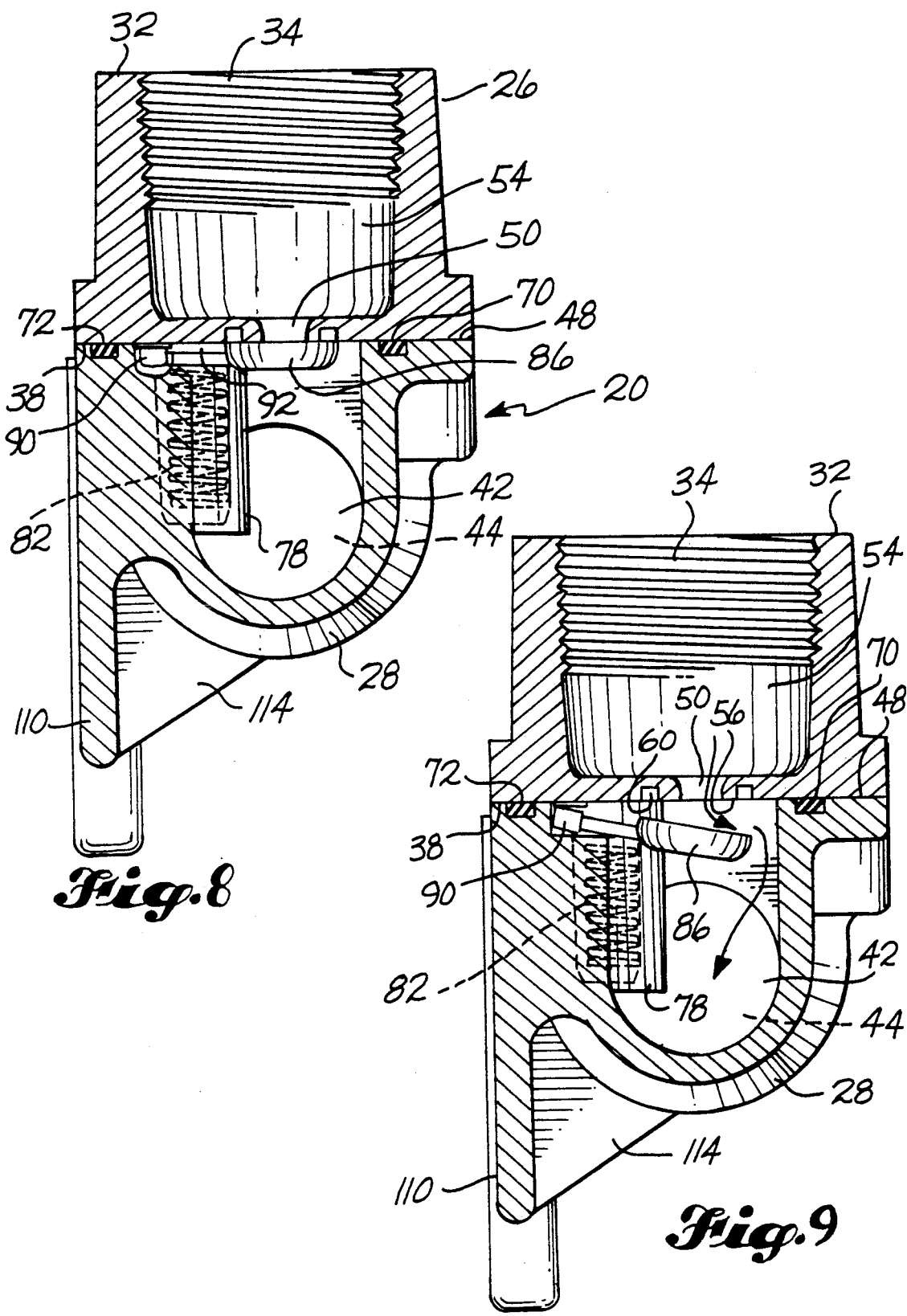

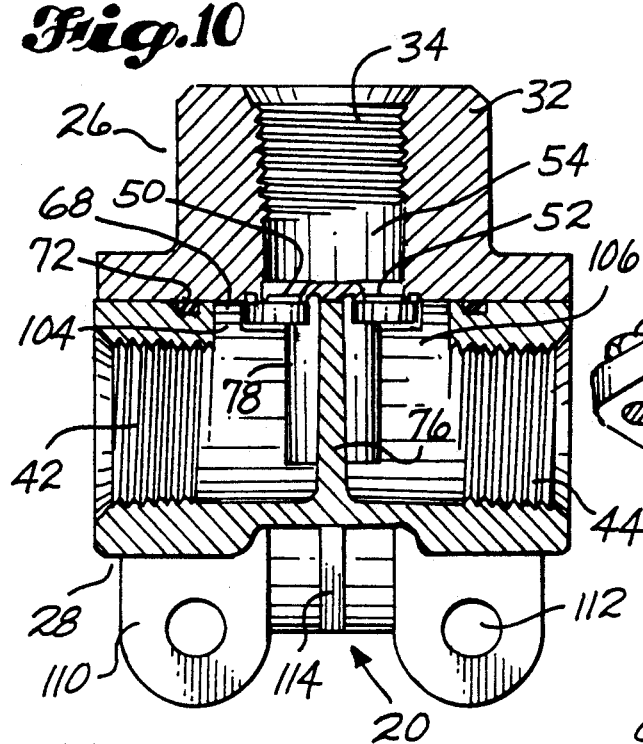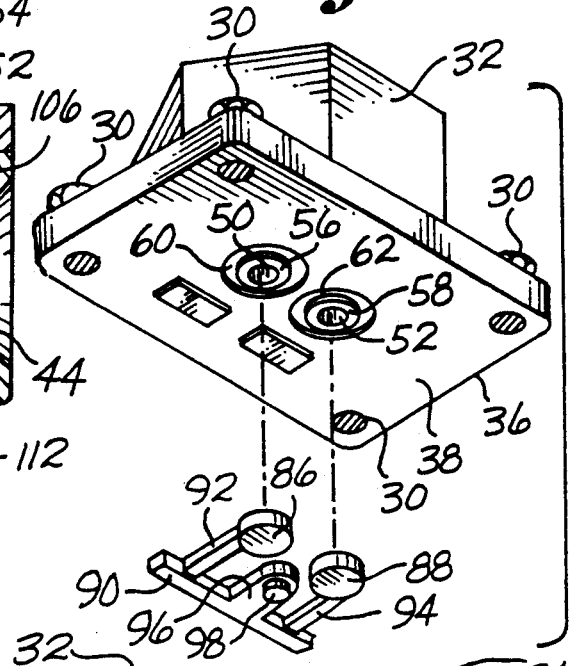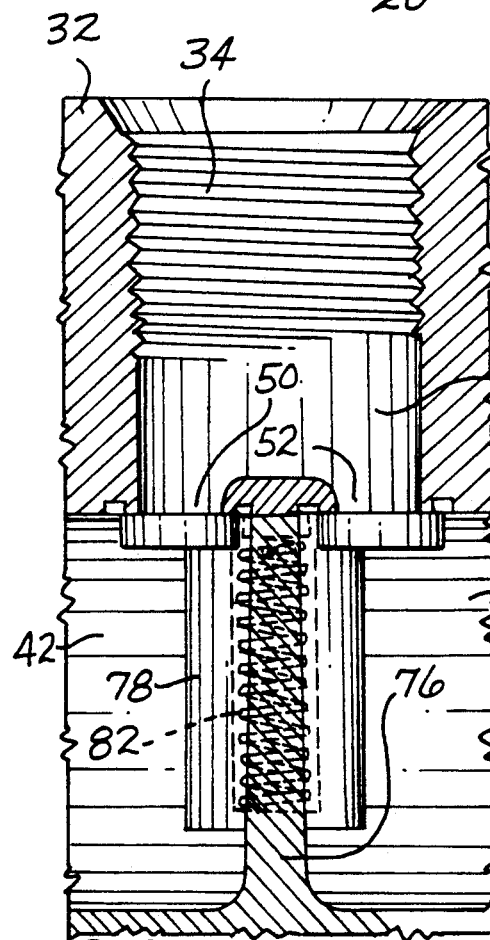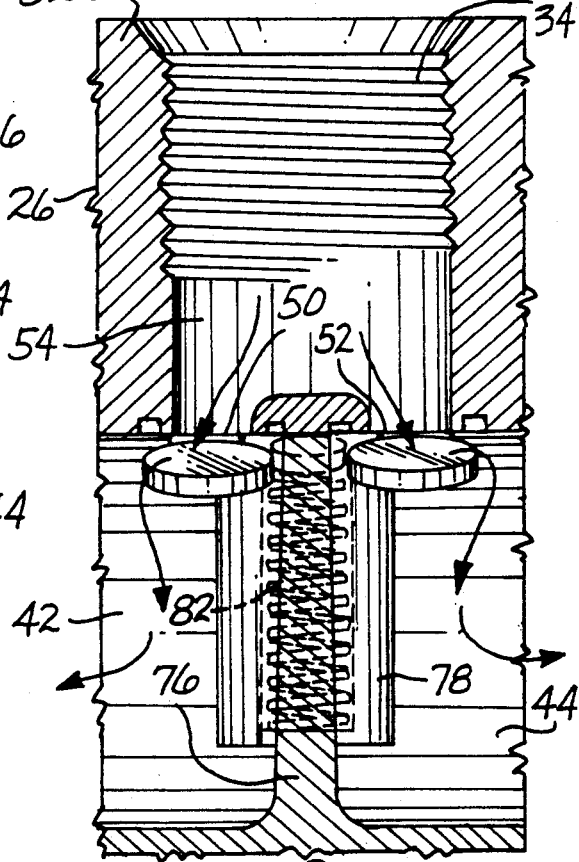

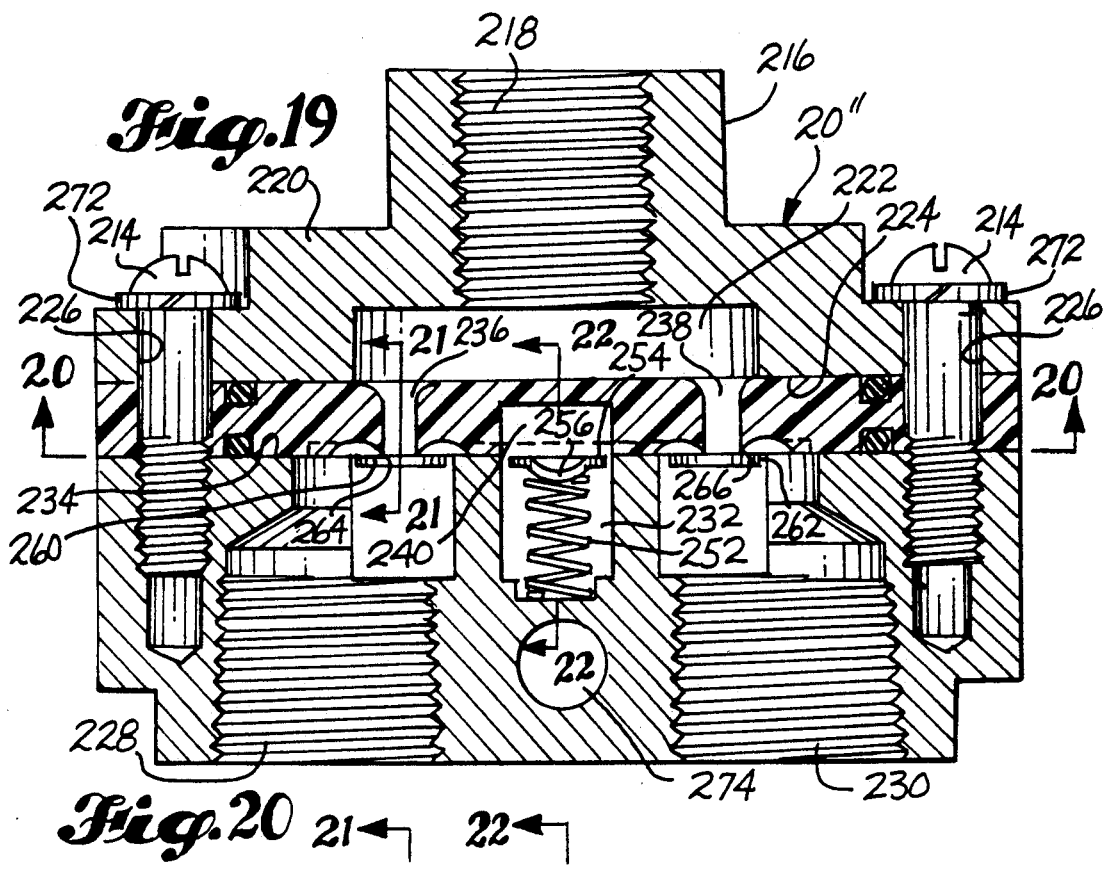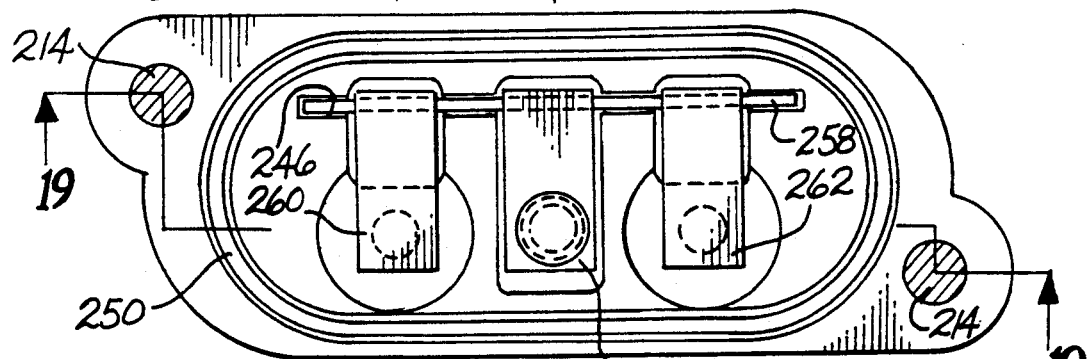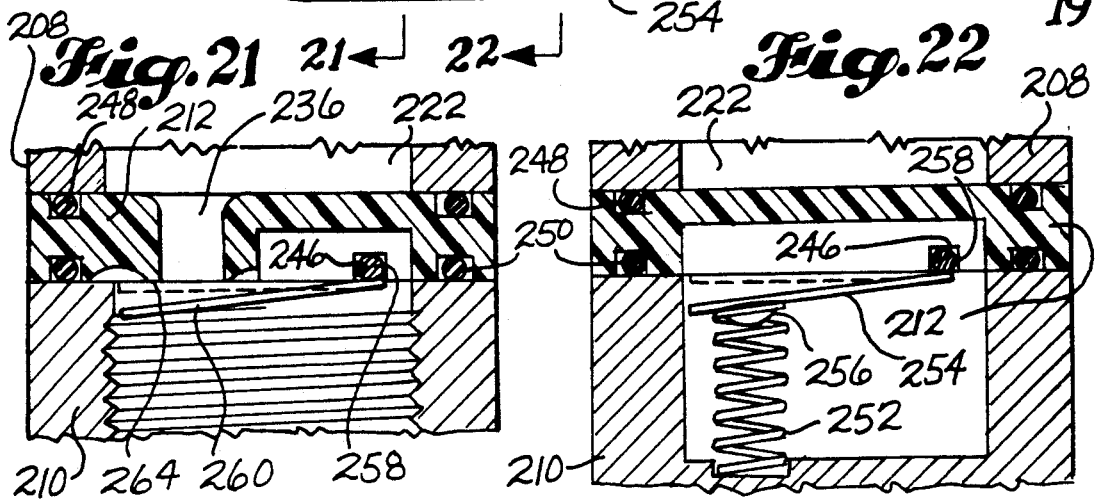

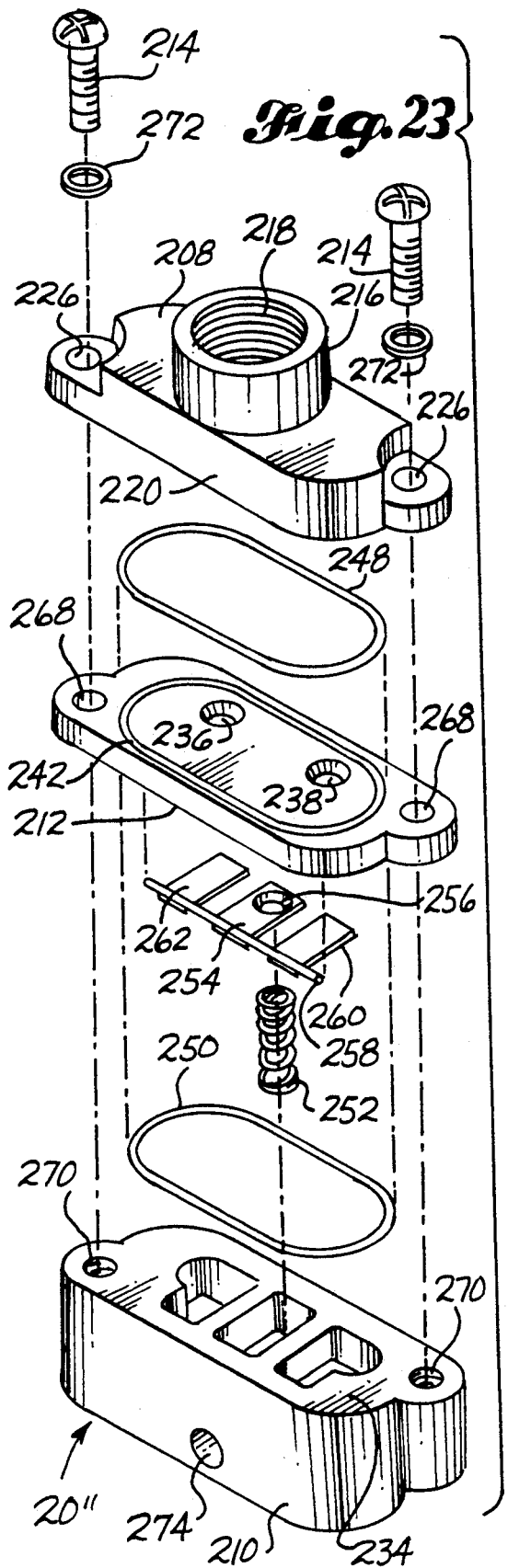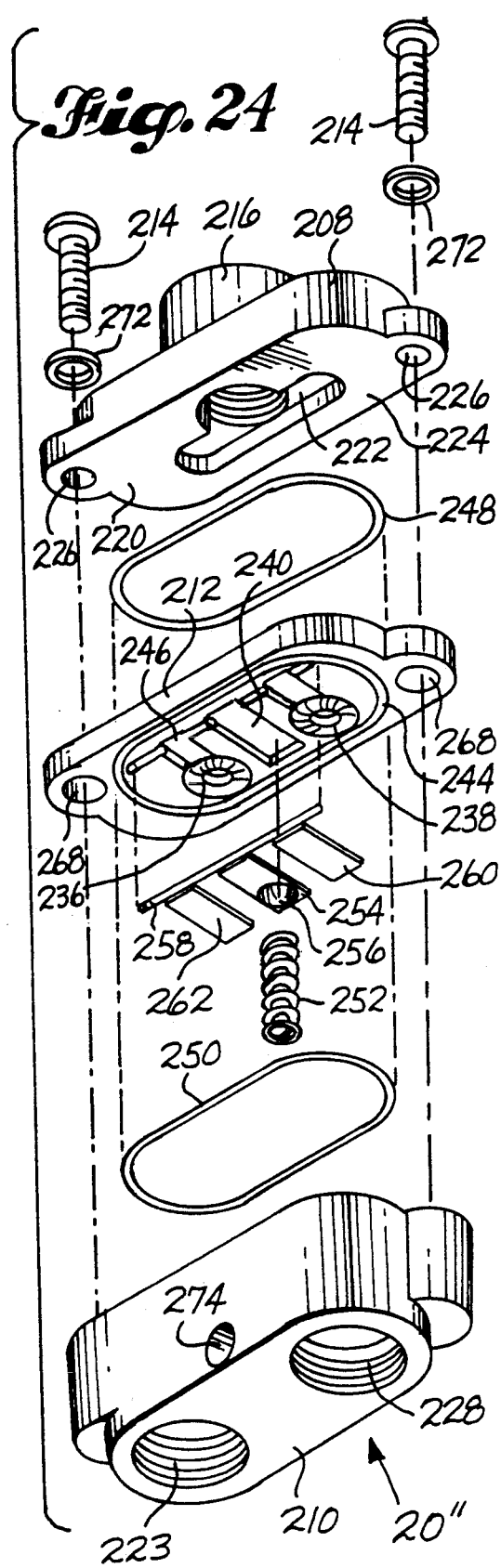

FLOW DIVIDER AND UTILIZATION SYSTEM

DESCRIPTION

1. Technical Field

This invention relates to a particular flow divider structure and to a two-tank fuel storage system in which such flow divider is used for substantially evenly dividing return fuel between the two fuel tanks.

2. Background Information

It is known to provide commercial trucks with two fuel tanks interconnected by a tube. The tube maintains the fuel level substantially equal in both tanks while fuel is being pumped out from one of the tanks. A problem with this type of system is that the tube must be located below the bottoms of the tanks. At this location the tube is susceptible to damage by contact with obstacles in its path projecting upwardly from the roadway.

A principal object of the present invention is to provide a two-tank system in which the tanks are discrete and the connector tube and its function are replaced by a simple top draw arrangement and a flow divider located in a return line for fuel that is being returned from the engine to the fuel tanks. Another object of the present invention is to provide a unique flow divider structure which may have general utility.

Disclosure of the Invention

An aspect of the invention is to provide a flow divider for substantially evenly dividing a liquid influent to the flow divider between two outlets leading out from the flow divider, independent of the amount of total flow entering the divider. Identically sized orifices would evenly divide the flow provided they were sized to cause an adequate pressure drop from inlet to outlet. However, in systems such as commercial truck fuel systems, variable flows of fuel occur, as well as variable amounts of included vapor introduced by the engine. If the flow, and therefore pressure drop, is too high, engine performance can be affected. On the other hand, if flow and pressure drop are too low, two fixed orifices would not have the equal flow dividing effect that is desired. An object of the invention therefore is to provide two coordinated variable orifices that will adjust equally and simultaneously to variations in flow while maintaining substantially constant pressure drop despite variations in total flow.

The flow divider of this invention comprises a housing including an inlet chamber, an inlet into the inlet chamber, and spaced apart first and second orifices leading out from said inlet chamber. A first outlet is in communication with the first orifice and a second outlet is in communication with the second orifice. A first closure member is positioned in the first outlet adjacent the first orifice and a second closure member is positioned in the second outlet adjacent the second orifice. A rigid connection extends between the closure members, connecting them to move together. A spring is operatively connected to the rigid connection, for rotating the rigid connection and the closure members, in a direction biasing the first closure member towards the first orifice and the second closure member towards the second orifice. Liquid pressure within the inlet chamber acting on the closure members will swing the closure members away from the orifices, against the spring, to allow liquid to flow through the orifices from the inlet chamber to the first and second outlets.

In preferred form, a spring arm is secured to the rigid connection. The spring includes a first end which contacts the spring arm and a fixed in position second end. The contact of the first end of the spring serves to operatively connect the spring to the rigid connection and the closure members. Also in preferred form, the housing includes a spring cavity located laterally between the first outlet and the second outlet. The second end of the spring is located within the spring cavity. The engagement of the spring cavity with the second end of the spring serves to fix the first end of the spring in position.

In preferred form, the housing is divided into an inlet housing member and an outlet housing member. The inlet housing member includes an inlet chamber, the inlet end of the inlet chamber, and an inner wall. The first and second orifices are located in the inner wall. The outlet housing member includes an inner wall that is contiguous the inner wall of the inlet housing member. The outlet housing member includes the first outlet and the second outlet. The inner wall of the outlet housing member includes a first opening and a second opening. The first opening confronts the first orifice and the second opening confronts the second orifice. The first opening communicates with the first outlet and the second opening communicates with the second outlet. A divider wall is located between the first and second openings and separates the first outlet from the second outlet. The outlet housing member includes a spring cavity.

In preferred form, the rigid connection includes an elongated pivot bar, a first support arm for the first closure member, extending laterally from the pivot bar, a second support arm for the second closure member, extending laterally from the pivot bar, parallel to the first support arm, and a spring arm located between the first and second support arms, said spring arm projecting laterally from the pivot bar in the same direction as the first and second support arms. The first closure member is located at an outer end of the first support arm. The second closure member is located at an outer end of the second support arm. The first and second closure members have closure surfaces which are substantially coplanar, said surfaces being directed towards the first and second orifices. The pivot bar, the first and second support arms, the first and second closure members and the spring arm, in combination, form a control member that is pivotable in position about contact between the pivot bar and a housing surface.

In other embodiments, the housing is divided into an inlet housing member, an outlet housing member and a divider wall member. The divider wall member is located between the inlet housing member and the outlet housing member. The inlet housing member includes an inlet cavity opening towards the divider wall member and an inlet passage leading into the inlet cavity. The inlet cavity and the divider wall together define the inlet chamber. The divider wall includes the first and second orifices. The outlet housing member includes the first and second outlets.

The divider wall member may include a longitudinal groove in which at least a portion of the pivot bar is located. A first seal ring is positioned between the inlet housing member and the divider wall member and a second seal ring is positioned between the divider wall member and the outlet housing member. The seal rings surround an area which includes the first and second orifices. In the case of the second seal ring, this area also includes the first and second closure members and the pivot bar.

Another aspect of the invention is to provide a fuel system for a vehicle which is characterized by first and second fuel storage tanks. A first delivery conduit extends from the first tank to a first inlet of a combiner, and a second delivery conduit extends from the second tank to a second inlet of the combiner. A third delivery conduit extends from the outlet of the combiner to an engine pump. The pump pumps fuel from the storage tanks to the engine. Some of the fuel is consumed in the engine. The remaining fuel is returned to the fuel storage tanks. A first return conduit extends from the engine to the inlet of a flow divider. A second return conduit extends from a first outlet of the flow divider to the first tank. A third return conduit extends from a second outlet of the flow divider to the second tank. Fuel pressure within the inlet chamber of the flow divider acts on two closure members in the flow divider, connected together by a rigid connection, and swings them together, away from two orifices, against the force of a spring which normally biases the closure members towards the orifices. Outlet fuel pressure acting on the closure members may exert a larger force on one closure member than on the other. However, because the two closure members are connected to a common pivot, the two closure members will move the same amount at all times and their flow regulating influence will be substantially equal. That is, there will be a substantially equal flow of fuel from the inlet chamber through each orifice into each outlet.

An object of the present invention is to provide a flow divider in a return line extending from an engine to two separate fuel tanks, and to provide the flow divider with flow controlling orifices and valve members which provide a positive pressure upstream of the orifices.

It is another object of the present invention to provide a flow divider which is relatively simple in construction, easy to assemble and disassemble, and which has a minimum of moving parts, is durable, and possesses a long use life.

Other objects, features, and advantages of the invention are hereinafter described in the description of the best mode or preferred embodiment of the invention.

BRIEF DESCRIPTION OF THE DRAWINGS

Like reference numerals and letters are used to designate like parts throughout the several views of the drawing, and:

FIG. 1 is a schematic drawing of a two-tank fuel system for an engine, showing fuel being pumped out of both tanks and being returned to both tanks;

FIG. 2 is a pictorial view of a preferred flow divider embodiment of the invention, provided to substantially evenly divide the return flow between the two tanks, such view being taken from above and looking towards the top, one side and one end of the flow divider, and showing the flow divider in an assembled condition;

FIG. 3 is an exploded pictorial view of the flow divider shown by FIG. 2, also taken from above the parts;

FIG. 4 is a top plan view of the flow divider shown by FIGS. 2 and 3;

FIG. 5 is an end view of the flow divider shown by FIGS. 2-4, taken substantially from the aspect indicated by line 5—5 in FIG. 4;

FIG. 6 is a front elevational view of the flow divider shown by FIGS. 2-5, taken substantially from the aspect indicated by line 6—6 in FIG. 5;

FIG. 7 is an enlarged scale sectional view taken substantially along line 7—7 of FIG. 6, such view presenting a top plan view of a flow control member that is mounted within the lower section of the housing;

FIG. 8 is a sectional view taken substantially along line 8,9—8,9 of FIG. 7, such view showing the flow control member in its static position;

FIG. 9 is a view like FIG. 8, but showing the flow control member in a flow-dividing position, opening in response to flow through the flow divider;

FIG. 10 is a sectional view taken substantially along line 10—10 of FIG. 7, such view showing the flow control member in its static position;

FIG. 11 is an exploded pictorial view of the upper section of the flow divider housing, and the control member spaced from its mounted position in the flow divider, such view being taken from below the part;

FIG. 12 is an enlarged scale sectional view taken substantially along line 10,12—10,12 of FIG. 7, showing the flow control member in its static position, and including a hidden line showing of the bias spring;

FIG. 13 is a view like FIG. 12, but showing the flow control member in a flow dividing position, opening in response to flow through the flow divider;

FIG. 19 is an enlarged scale sectional view taken substantially along line 19—19 of FIG. 20, such view showing the flow control member in its static position;

FIG. 20 is a sectional view taken substantially along line 20—20 of FIG. 19;

FIG. 21 is a sectional view taken substantially along line 21—21 of FIG. 20, such view including a solid line showing of the closure member in a flow dividing position, and a broken line showing of the flow control member in its static position;

FIG. 22 is a sectional view taken substantially along line 22—22 of FIG. 20, such view including a broken line showing of the flow control member in its static position and a solid line position of the flow control member and the bias spring in a flow dividing position;

FIG. 23 is an exploded pictorial view of the flow divider shown by FIGS. 18-21, such view being taken from above, one side and one end of the flow divider, and looking downwardly on the various components of the flow divider; and FIG. 24 is a view like FIG. 23, but looking upwardly towards the various components of the flow divider.

BEST MODE FOR CARRYING OUT THE INVENTION

Figure 14:
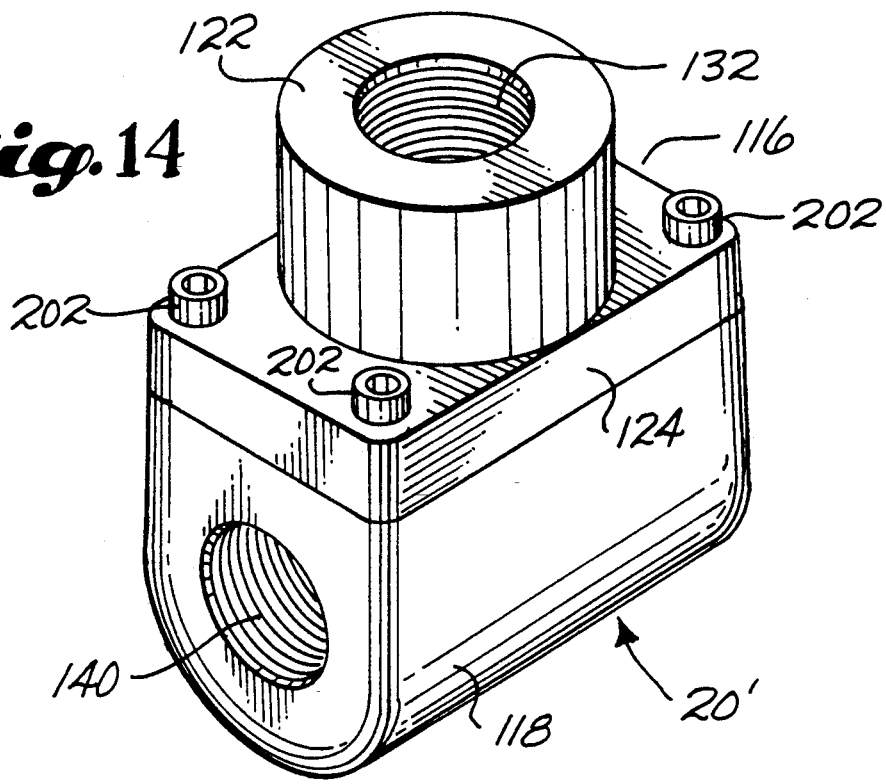
FIG. 14 is a pictorial view of a second embodiment of the flow divider, such view being taken from above and looking toward one end and one side of the flow divider, and showing the flow divider in an assembled condition.

Referring to FIG. 1, a fuel system for a vehicle is shown to include a first tank A and a second tank B, which are mounted on the same vertical level. A first draw line 10 extends from tank A to a flow combiner 12. A second draw line 14 extends from tank B to the flow combiner 12. The fuel flow from tanks A and B is combined within the flow combiner 12 and the combined flow flows out from flow combiner 12 through line 16 to a pump P. Flow combiner 12 may be a simple tee-fitting. Line 16 is considered to be a part of the pump inlet. The pump P is a part of the vehicle engine. Pump P pumps a first portion FB of the fuel into the working chambers of the engine, to be burned. A second portion FR of the fuel is delivered from the engine into a return line 18. Return line 18 is connected to the inlet of a flow divider valve 20. Flow divider valve 20 has a first outlet which is connected to a return line 22 leading back to tank A. Flow divider 20 also includes a second outlet which is connected to a return line 24 which leads back to tank B.

FIGS. 2-3 illustrate the preferred embodiment of flow divider 20. Flow divider 20 comprises an inlet section 26, an outlet section 28 and a plurality of bolts 30 which connect the two sections 26, 28 together. Inlet section 26 includes a tubular inlet 32 which may be internally threaded at 34. Threads 34 receive a threaded end portion of a fitting used to connect return line 18 (FIG. 1) to the inlet 32. Inlet section 26 includes a base portion 36, which may be rectangular in shape with rounded corners, and a planar lower surface 38. Base portion 36 includes corner openings 40 through which the screws 30 extend.

Outlet section 28 includes a pair of outlet ports 42, 44 (FIG. 10). Preferably, these ports 42, 44 are internally threaded to receive threaded end portions of fittings used to connect the outlet ports 42, 44 to the return lines 22, 24. Outlet section 28 also includes an upper body portion 46 which conforms in shape to body member 26. It includes a substantially flat upper surface 48 which mates with surface 38 on inlet section 26 (FIG. 10). Referring to FIGS. 10-13, base portion 36 of inlet section 26 includes a pair of orifices 50, 52. Orifices 50, 52 are side-by-side and both communicate with an inlet chamber 54 located within tubular inlet 32. As shown by FIGS. 11-13, on the lower side of base portion 36, the orifices 50, 52 are surrounded by annular seats 56, 58 which are in turn surrounded by annular grooves 60, 62. The seats 56, 58 are substantially coplanar with surface 38. The central region of base portion 36, which includes orifices 50, 52, fits within the confines of a recess 68 formed in the top of housing portion 46 (FIGS. 3 and 7). Recess 68 is surrounded by a generally rectangular seal groove 70, having rounded corners, into which a seal ring 72 is received (FIG. 10). An elongated channel 74 is formed along one side of the recess 68. The recess is divided in half by a divider wall 76 which also forms a separation between the outlet ports 42, 44 (FIGS. 10, 12 and 13). In preferred form, the divider wall 76 includes a tubular portion 78 adjacent channel 74. Portion 78 includes a spring socket 80 in which an elongated coil spring 82 is received.

A control member 84 is adapted to be received within the recess 68, between inlet section 26 and outlet section 28. Control member 84 includes a pair of closure members 86, 88, one for each orifice 50, 52. Closure members 86, 88 are secured together by a rigid connection. The upper surfaces of members 86, 88 confront the seats 56, 58. The upper surfaces of closure members 86, 88 are substantially parallel and are maintained substantially parallel by the rigid connection. The rigid connection may comprise an elongated pivot bar 90 and a pair of support arms 92, 94. The upper surface of the pivot bar 90 is coplanar with the upper surfaces of the closure members 86, 88. Support arm 92 extends perpendicularly from pivot bar 90 to closure member 86. In similar fashion, support arm 94 extends perpendicularly from pivot bar 90 to closure member 88. A spring arm 96 is located between the support arms 92, 94. In preferred form, spring arm 96 is shorter than the support arm/closure member units 92, 86 and 94, 88, respectively. Spring arm 96 is spaced vertically above the spring socket 80. Spring 82 fits down within the spring socket 80. The lower end of spring 82 rests on a closed base surface inside socket 80. The upper end of spring 82 contacts the lower surface of spring arm 96. Spring arm 96 may include a short peg 98 which fits into the end of the spring and retains the spring 82 in contact with the spring arm 96. Pivot bar 90 fits within channel 74. Support arms 92, 94 extend through sidewall openings 100, 102. As best shown by FIG. 8, spring 82 biases control member 84 in a position with the upper surface of pivot bar 90 against lower surface 38 of inlet section 26 and the upper surfaces of closure members 86, 88 against seats 56, 58. This is the static position of control member 84. As best shown by FIG. 3, the recess 68 includes an opening on each side of divider wall 76. These openings 104, 106 lead to the outlet ports 42, 44, respectively.

The assembly of flow divider 20 will now be described. Outlet section 28 of the housing is positioned with the recess 68 directed upwardly. Spring 82 is dropped into the spring socket 80. Then, control member 84 is lowered to place locator pin 98 within the upper end of spring 82, and the pivot bar 90 within channel 74. This places support arms 92, 94 within the channel side openings 100, 102. Next, seal ring 72 is placed into the seal ring groove 70. Then, inlet housing 26 is moved downwardly, placing member 36 into registry with member 46, and surface 38 against surface 48. Openings 40 are aligned with threaded openings 108. Then, screws 30 are inserted through openings 40 and are threaded into openings 108, to secure the two sections 36, 46 together. This places the control member 84 in the position shown by FIG. 8. Seal ring 72 seals around the recess 68 and around the contact of control member 84 with surface 38 and seats 56, 58.

In preferred form, housing section 28 is provided with a mounting pad 110. Mounting pad 110 extends generally perpendicular from housing portion 46 and includes a pair of mounting screw receiving openings 112. A triangular gusset 114 may connect between mounting pad 110 and the main body of outlet section 28, as shown in FIG. 5. Suitable mounting screws (not shown) may be inserted through the openings 112 and used to secure the flow divider 20 to a wall or frame portion of the vehicle. Next, return line 18 is connected to inlet 34. Return lines 22, 24 are connected to outlet ports 42, 44, respectively. The flow divider 20 is now ready for operation.

In operation, return flow through line 18 enters inlet chamber 54. The return flow encounters orifices 50, 52 in a closed position. This causes the pressure to rise in inlet chamber 54 and in return line 18. If the system included a plain tee-fitting in place of flow divider 20, the pressure in return line 18 could vary unpredictably depending on several factors. These include the amount of flow, whether line 18 is fully or partially full of fuel, whether return lines 22, 24 are fully or partially full of fuel, and the elevation difference from the engine to the tanks. When flow divider 20 is employed, the orifices 50, 52 and the closure members 86, 88 cause a pressure build up to occur in return line 18 and inlet cavity 54. The pressure in cavity 54 via orifices 50, 52 acts on the closure members 86, 88, and causes these members 86, 88 to rotate in position. Members 86, 88 will rotate in position equal amounts, because they are both connected to the pivot bar 90. The pivot bar 90 and arms 92, 94 provide a never changing rigid connection between the closure members 86, 88. Fuel pressure acting on closure members 86, 88 will swing the closure members 86, 88 towards the openings 104, 106, leading to the outlet ports 42, 44. This will rotate the entire control member 84 about contact between pivot bar 90 and the surface 38. As it rotates, control member 84 moves spring arm 96 against bias spring 82. Spring 82 will resist a free movement of closure members 86, 88 to wide open positions. The spring force and the sizing of the orifices 50, 52 will have a controlling effect on the amount of flow which will flow through the orifices 50, 52. The closure members 86, 80 will always move the same amount. This is because they are connected together by the rigid connection. Therefore, the closure members 86, 88 will restrict orifices 50, 52 the same amount. This will cause a substantial equal division of fuel flow from inlet chamber 54 through the two orifices 50, 52, into the two return lines 22, 24. In this way, there is a substantially equal return flow of fuel from the engine to the two tanks A, B, despite variations in total fuel flow from the engine.

It has been found that the pump P will draw a substantially equal amount of fuel from the two tanks A and B when a T-fitting is used in the draw side, provided the draw lines 10, 14 are similar in size and length, and are filled with fuel. The problem occurs in the return side of the system. Testing has shown that if a tee-fitting like fitting 12 were to be used in place of flow divider 20, there would be a random, uneven or unpredictable distribution of the return fuel between lines 22 and 24 and hence between tanks A and B. It has been found that, when the flow divider 20 is used in the return side of the system, a standard tee-fitting 12 can be used in the draw side and the fuel level in the two tanks A and B will be maintained substantially constant throughout the operation of the system. A substantially equal amount of fuel will be pumped out from each tank A and B and a substantially equal amount of fuel will be returned to the two tanks A and B.

Herein, draw lines 10, 14, 16 are sometimes referred to as delivery conduits. Return lines 18, 22, 24 are sometimes referred to as return conduits. Members 86, 88 are sometimes referred to as closure members. Pivot rod 90 and support arms 92, 94 are sometimes referred to as a rigid connection. Spring arm 96 may be considered a part of this rigid connection.

The embodiment shown by FIGS. 2-13 is presently considered to be the best mode of the invention. It is composed of a relatively few parts. It is constructed to be easily assembled and disassembled. The embodiment shown by FIGS. 14-17 was developed prior to the embodiment shown by FIGS. 2-13. The embodiment shown by FIGS. 19-24 was developed prior to both the embodiment shown by FIGS. 2-13 and the embodiment shown by FIGS. 14-17.

Figure 15:
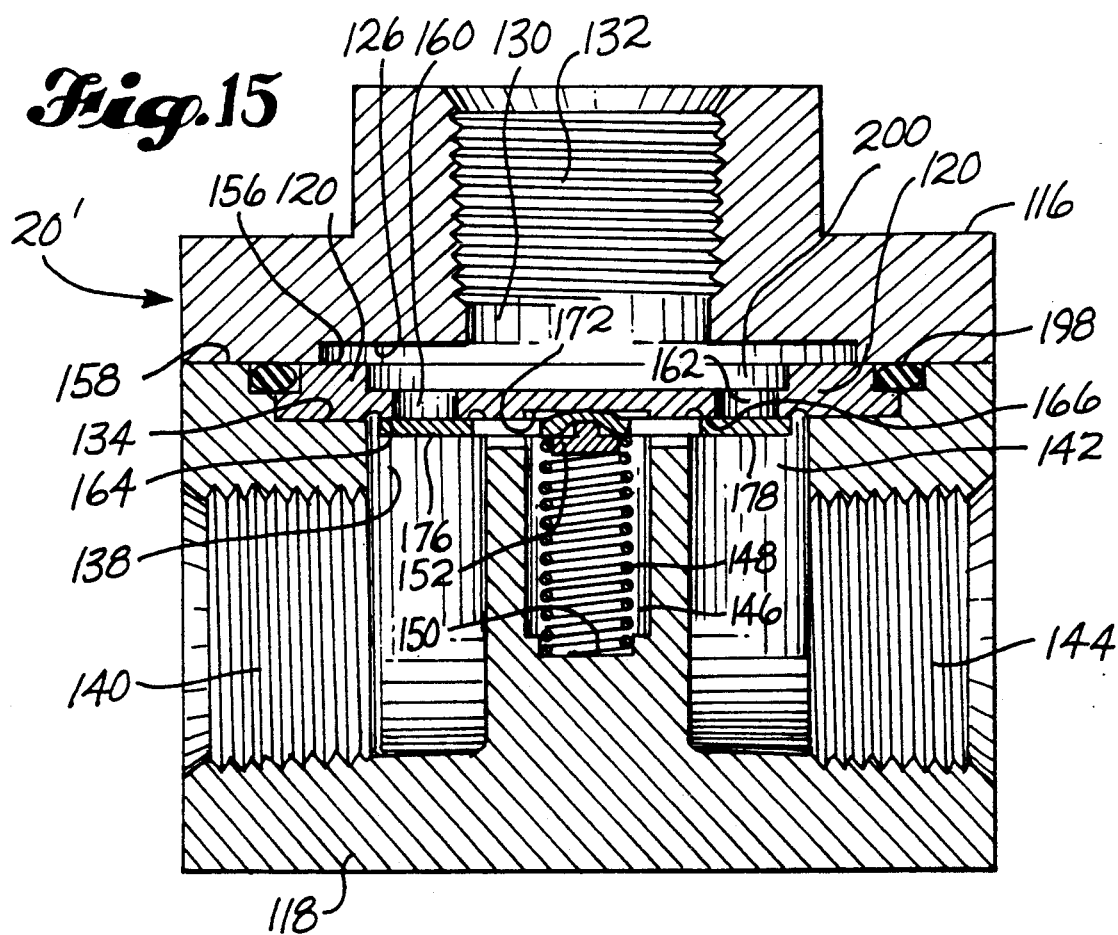
FIG. 15 is a sectional view like FIG. 10, but through the embodiment shown by FIG. 14, such view showing the flow control member in its static position.
Figure 16:
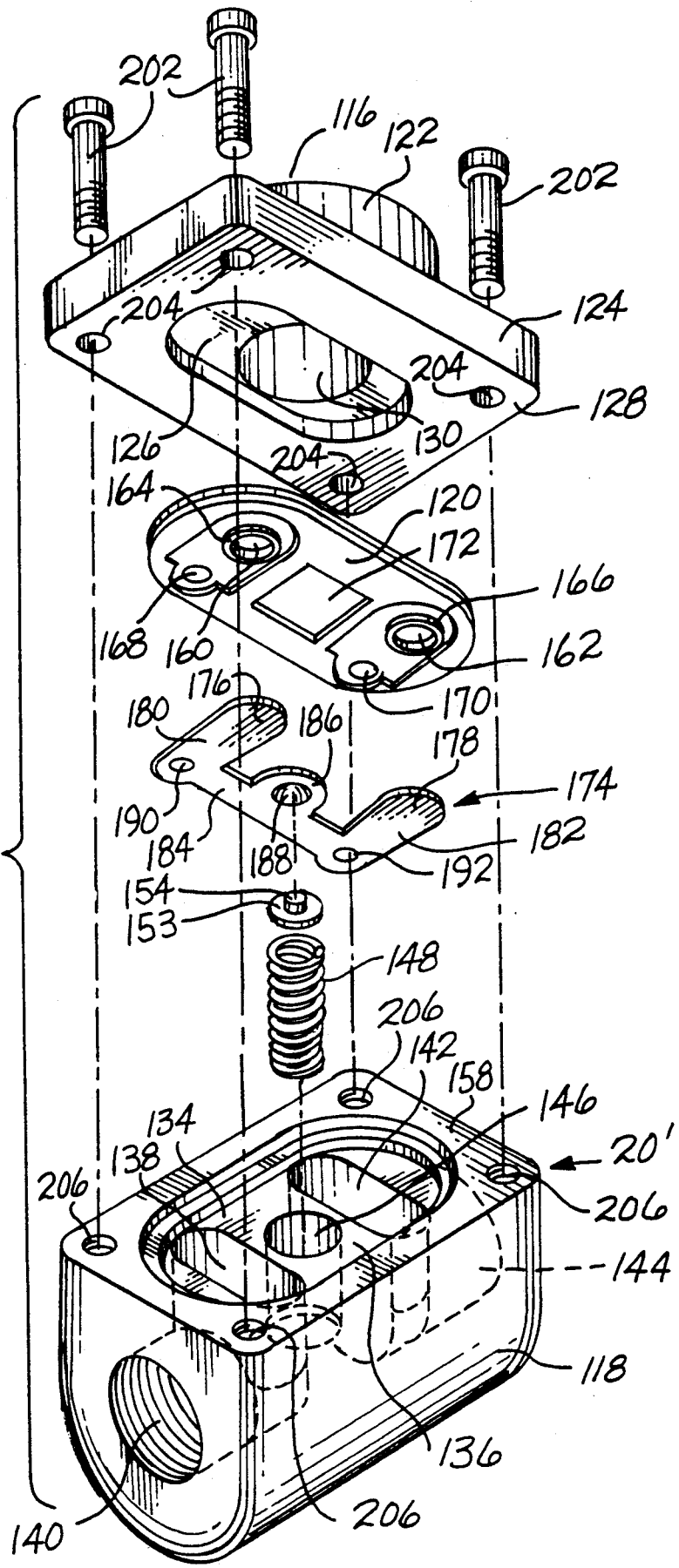
FIG. 16 is an exploded pictorial view, similar to FIG. 3, but of the embodiment of FIGS. 14 and 15; and looking upwardly towards the flow control member, an insert which includes the flow dividing orifices, the upper section of the housing and bolts used to secure the housing sections together, and looking downwardly towards a bias spring, a plug at the upper end of the bias spring and the lower section of the housing.

FIGS. 14-17 show a second embodiment of the invention, designated 20'. Flow divider 20' comprises an inlet section 116, an outlet section 118 and a divider wall 120. As best shown by FIG. 16, inlet section 116 includes a tubular inlet 122 which projects upwardly from a generally rectangular base 124. The lower side of base 124 includes a recess 126 surrounded by a generally planar surface 128. A central portion of the recess communicates with an inlet chamber 130 within the tubular inlet 122. Tubular inlet 122 includes an internally threaded opening 132. Opening 132 leads into the inlet chamber 130, 126.

Figure 17:
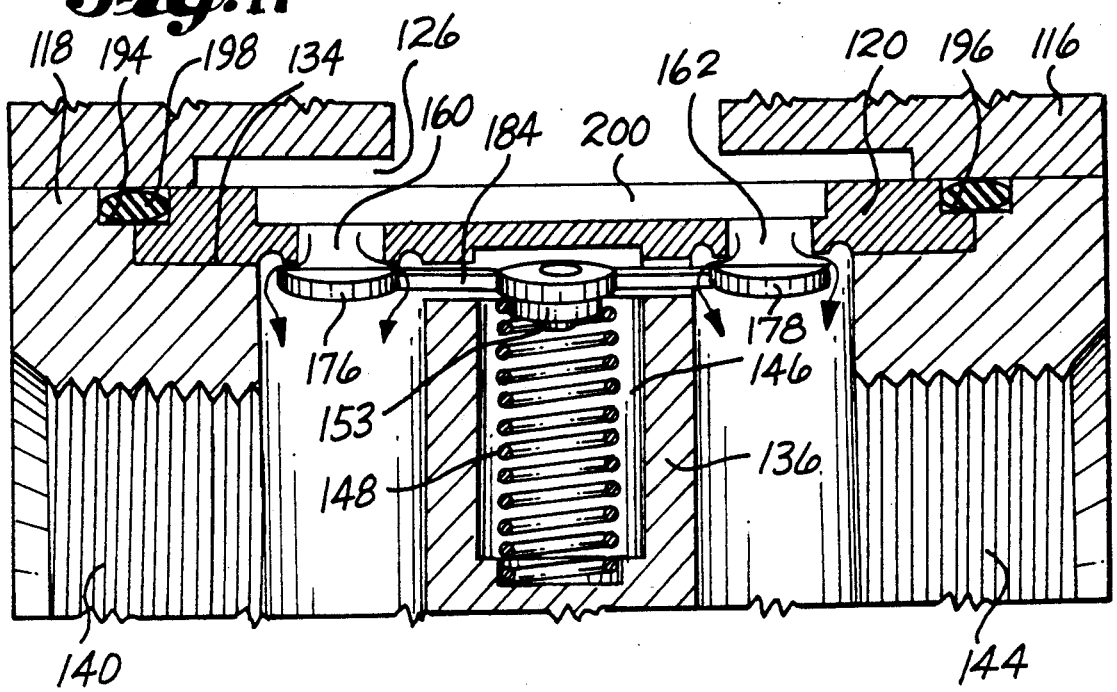
FIG. 17 is an enlarged scale sectional view, of the central portion of FIG. 15, but showing the flow control member in a flow controlling position, opening in response to flow through the flow divider.

Outlet section 118 includes an upper recess 134, the upper surface of a divider wall 136 divides the recess into two parts. One part includes an opening 138 which leads to a first outlet port 140. The other part includes an opening 142 which leads to a second outlet port 144. A spring socket 146 is formed in the central portion of divider 136. A bias spring 148 fits down into spring socket 146. The lower end of spring 148 rests on a socket bottom 150 (FIG. 15). The lower end of spring 148 may be snugly received within a reduced diameter lower end portion of the socket 146. This engagement of the spring 148 and the spring socket 148 fixes the spring 148 in position. In this embodiment the upper end of spring 148 may be provided with a plug 152, having a lower portion which fits into the upper end of the spring 148, and an upwardly directed peg 154. In this embodiment, the divider wall 120 fits down into the recess 134. When divider wall 120 is within the recess 134 it presents an upper surface 156 which is generally flush with the upper surface 158 of outlet member 118. This surface 158 surrounds the recess 134. In this embodiment, the two orifices 160, 162 are formed in the divider wall 120. An annular seat 164 is formed around orifice 160. An annular seat 166 is formed around orifice 162. The divider wall 120 includes a rounded pivot surface or button 168 and a rounded pivot surface or button 170. The lower central portion of divider wall 120 includes a shallow recess 172. In this embodiment, a control member 174 is provided which comprises closure members 176, 178, support arms 180, 182, a connector bar 184 and a spring arm 186. A spring arm 186 includes a downwardly opening dome 188, presenting an upwardly directed convex surface which fits within recess 172 (FIG. 15). Closure member 174, at the ends of arms 180, 182 opposite the closure members 176, 178, include pivot openings 190, 192. These buttons engage the rounded pivot surfaces 168, 170. When spring 148 is within the spring cavity 146, and control member 174 is within recess 134, and the divider wall 120 is also within the recess 134, the spring 148 biases the upper flat surfaces of closure members 176, 178 into contact with the seats 164, 166. As shown by FIGS. 15 and 17, the main recess 134 is surrounded by a peripheral recess 194. Divider wall 120 includes a peripheral recess 196. The floor of recess 194 is substantially coplanar with the floor of recess 196. Together the recess 194, 196 form a channel which extends around the outer periphery of divider wall 120 and the inner periphery of recess 134. The transverse center of this channel is where the outer periphery of divider wall 120 meets the inner periphery of recess 134. This permits the use of a single seal ring 198, placed in the channel 194, 196, to seal against leakage between the inlet housing section 116 and the outlet housing section 118.

FIG. 15 shows the flow divider in its static condition. The bias spring 148 biases the closure members 176, 178 into closed positions against the seats 164, 166. Divider member 120 includes an upper central recess 200 which opens upwardly towards the recess 126. In this embodiment, the recesses 126, 200 form a portion of the inlet chamber 130.

As in the first embodiment, the two housing parts 116, 118 are secured together by a plurality of bolts 202. The bolts 202 are inserted first through openings 204 within base portion 124 of housing part 116 and are then threaded into threaded openings 206 in the corner regions of housing part 218.

Flow divider 20' is assembled in the following manner. Spring 148, with plug 153 attached, is dropped down into the spring socket 146. Then, the control member 174 is set in place, with peg 154 within recess 188. Next, divider wall 120 is set down within the recess 134, above control member 174. Then, the seal ring 198 is installed. Then, inlet housing member 116 is placed down onto outlet housing member 118, with openings 204 aligned with openings 206. Then, screws 102 are moved through openings 204 and are screwed into the openings 206.

As previously stated, FIG. 15 shows the static position of the various components of the flow divider 20'. As in the first embodiment, the orifices 160, 162 and the closure members 176, 178 cause a pressure buildup within the inlet chamber 130 and line 118 leading to inlet 132. Eventually this pressure will act on the closure members 176, 178, and will tilt the control member 174 in position, causing the members 180, 176 and 182, 178 to rotate about the contact of openings 190, 192 with pivot regions 168, 170, respectively. Control member 174 will rotate against spring 148, causing the spring 148 to compress (FIG. 17). The closure members 176, 178 will be moved away from the orifices 160, 162, and allow flow through the orifices 160, 162, into the openings 138, 142, and from there to the outlet ports 140, 144, respectively.

Figure 18:
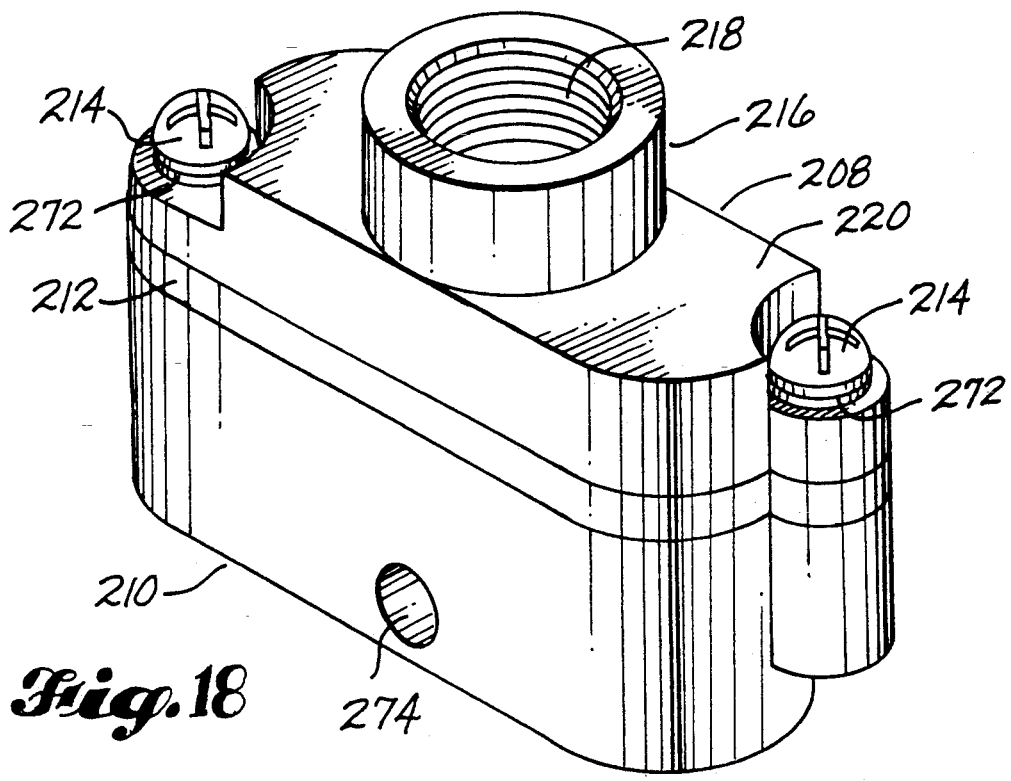
FIG. 18 is a pictorial view of a third embodiment of the flow divider, taken from above and looking toward the top, one side and one end of the flow divider.

FIGS. 18-24 show a third embodiment of the flow divider. This embodiment is designated 20''. Flow divider 20'' includes an inlet section 208, an outlet section 210 and a divider wall 212. Divider wall 212 is positioned between sections 208 and 210 and the assembly is secured together by a pair of screws 214. Referring to FIGS. 18 and 19, the inlet section 208 includes a tubular inlet 216 which may be internally threaded at 218. Threads 218 receive the threaded end portion of the fitting used to connect return line 18 to the inlet 216, as in the first two embodiments. Inlet section 208 includes a base portion 220 in the form of a member which extends perpendicular to tubular inlet 216 and includes an inlet cavity 222 and an end surface 224 (FIG. 24). Base portion 220 includes openings 226 for receiving the fasteners 214.

Outlet section 210 includes a pair of outlet ports 228, 230. Preferably, these outlet ports 228, 230 are internally threaded to receive threaded end portions of fittings used to connect the outlet ports 228, 230 to the return lines 22, 24. Outlet section 210 also includes a spring cavity 232. The outlet ports 228, 230 include inner ends at the plane of an end surface 234 (FIG. 20).

Divider wall 212 includes a pair of orifices 236, 238 which communicate with the outlet ports 228, 230 when the flow divider 20'' is assembled (FIG. 19). Divider wall 212 also includes a center cavity 240 which is located above the spring cavity 232. Cavity 240 is positioned laterally between the orifices 236, 238 (FIG. 19). Divider wall 212 includes upper and lower seal ring receiving grooves 242, 244 and a pivot member groove 246 in its side which faces surface 232 of outlet section 210. As best shown by FIG. 19, an O-ring seal 248 is located within seal ring groove 242. A second O-ring seal 250 is located within seal ring groove 244.

As shown in FIG. 19, the base of spring cavity 232 has a reduced diameter portion in which the base end of a spring 252 is received. The base end of spring 252 is against a base surface at the floor of the spring cavity 232. The opposite end of spring 252 is against spring arm 254. As best shown in FIGS. 19, 22 and 24, spring arm 254 may include a protuberance 256 which extends into the outer end of spring 252. Spring arm 254 extends laterally outwardly from a pivot bar or shaft 258, between a pair of closure members 260, 262. Closure members 260, 262 are secured at one end to the pivot member 258, in such a manner that each is fixed in position relative to the other.

The static position of the unit 254, 258, 260, 262 is shown in FIG. 19. In this position the closure members 260, 262 contact annular seats 264, 266 which surround the orifices 236, 238, respectively (FIG. 19). Spring 252, acting on spring arm 254, biases the closure members 260, 262, into seated positions. Closure members 260, 262 have flat surfaces which face the seats 264, 266. These flat surfaces are substantially coplanar. As illustrated, the seats 264, 266 are surrounded by annular grooves in the divider member.

All three members 254, 260, 262 are rigidly connected to the pivot bar or shaft 258. As previously stated, the force of bias spring 252 acting on spring arm 254 tends to rotate the member 258 in a direction which places closure members 260, 262 in seated positions relative to orifices 236, 238. In FIG. 21, a second position of closure member 260 is shown in solid line. In this position, closure member 260 has swung away from its seated position. FIG. 21 includes a phantom line showing of closure member 260 in its seated position. In similar fashion, FIG. 22 includes a solid line showing of spring arm 254 in the position which it occupies when closure member 260 is in the position shown in FIG. 21. FIG. 22 also includes a phantom line showing of spring arm 254 in its static position.

The assembly of flow divider 20'' will now be described. Referring to FIGS. 23 and 24, bias spring 252 is placed within spring cavity 232. O-ring seal 250 is placed within the seal groove 244. Assembly 254, 258, 260, 262 is moved to the lower surface of divider wall 12 and pivot member 258 is placed into pivot member groove 246 (FIGS. 20–22). Then, divider wall 212 is moved into contact with outlet section 210, with nonthreaded openings 268 in divider wall 212 aligned with threaded openings 270 in outlet section 210. Next, O-ring seal 248 is placed within seal ring groove 242 and inlet section 208 is moved downwardly onto the divider wall 212, with its non-threaded openings 226 aligned with the openings 268, 270. Then, screws 214 are inserted through washers 272 and openings 272, 268 and then into threaded openings 270. Bolts 214 are then rotated to complete the assembly. A mounting hole 274 may be provided in outlet section 210, for receiving a mounting bolt (not shown).

In operation, the embodiment shown by FIGS. 18–24 operates essentially the same as the first two embodiments. Compression spring 252, acting on spring arm 254, biases the closure members 260, 262 into seated positions, against the annular seats 264, 266. Fuel flow from line 18 into the inlet chamber 222, moves through the orifices 236, 238 and acts on the closure members 260, 262. There is first a pressure buildup in line 18 and inlet chamber 222 and then the pressure acts on the closure members 260, 262, to swing them downwardly about the axis of pivot member 258, to in this manner open the orifices 236, 238 and permit flow into the two chambers of the outlet section 210 which communicate with the outlet ports 228, 230, respectively. The orifices 236, 238 are constructed to be essentially identical in size and flow influencing characteristics. The connection of the two closure members 260, 262 together, by the rigid connection afforded by pivot member 258, results in the closure members 260, 262 moving equal amounts. For example, if the pressure acting on closure member 260 is larger than the pressure acting on closure member 262, member 260 will want to move open a greater amount than closure member 262. However, since the closure members 260, 262 are connected together, closure member 262 will move the same amount as closure member 260. In response, fuel flow through the orifices 236, 238 will be substantially equal.

All three flow divider embodiments are usable in the fuel tank system that is illustrated and described. Features of the disclosed embodiments may be combined to produce other embodiments. The invention is not to be limited to the details of the illustrated embodiments. Rather, coverage is to be determined by the claims which follow, construed in accordance with the rules of patent claim construction, including use of the doctrine of equivalents.

What is claimed is:

1. A flow divider, comprising:
    a housing;
    an inlet chamber in said housing;
    an inlet into said inlet chamber;
    spaced apart first and second orifices leading out from said inlet chamber;
    a first outlet in communication with the first orifice;
    a second outlet in communication with the second orifice;
    a first closure member in the first outlet adjacent the first orifice and a second closure member in the second outlet adjacent the second orifice;
    a rigid connection between both closure members; and
    a spring operatively connected to the rigid connection, for rotating the rigid connection in a direction biasing the first closure member towards the first orifice and the second closure member towards the second orifice,
    wherein liquid pressure within the inlet chamber acting on the closure members will swing the closure members in unison away from the orifices, against the spring, to provide equal flow restrictions to control liquid flow through the orifices from the inlet chamber to the first and second outlets.

2. A flow divider according to claim 1, including a spring arm connected to the rigid connection, and wherein said spring includes a first end which contacts the spring arm and a fixed second end, contact between the first end of the spring and the spring arm serving to operatively connect the spring to the rigid connection.

3. A flow divider according to claim 2, wherein the housing includes a spring cavity located laterally between the first outlet and the second outlet, and wherein the second end of the spring is located within said spring cavity, said spring cavity serving to fix the second end of the spring in position.

4. A flow divider according to claim 1, wherein said housing comprises an inlet housing member and an outlet housing member; said inlet housing member including said inlet chamber, said inlet into the inlet chamber, and an inner wall; and said first and second orifices being located in said inner wall.

5. A flow divider according to claim 4, wherein said outlet housing member includes an inner wall that is contiguous to the inner wall of the inlet housing member, and wherein said outlet housing member includes said first outlet and said second outlet.

6. A flow divider according to claim 5, comprising first and second openings in the inner wall of the outlet housing member, said first opening confronting said first orifice and said second opening confronting said second orifice, and said first opening communicating with the first outlet and said second opening communicating with the second outlet; and a divider wall between the first and second openings, said divider wall separating said first and second outlets.

7. A flow divider according to claim 6, wherein a spring arm is connected to the rigid connection; wherein said outlet housing member includes a spring cavity located laterally between the first and second outlets; and wherein said spring is located within the spring cavity, said spring having a first end which contacts the spring arm and a second end, and said spring cavity serving to fix the second end of the spring in position.

8. A flow divider according to claim 7, wherein the rigid connection, the spring arm, the first closure member and the second closure member, in combination, form a control member; and wherein said control member is located within a recess formed on said outlet housing member.

9. A flow divider according to claim 8, wherein said rigid connection includes a pivot bar, and wherein said recess includes a channel at a side of the recess in which the pivot bar is received, said channel including spaced apart lateral openings in which portions of the first and second closure members are received.

10. A flow divider according to claim 9, wherein the inner wall of the outlet housing member includes a seal ring receiving groove surrounding said recess and opening towards the inner wall of the inlet housing member, said flow divider further including a seal ring within said groove, and wherein the first and second orifices are located within the confines of the seal ring.

11. A flow divider according to claim 9, wherein the pivot bar has a contact surface which confronts the inner wall of the inlet housing member, and said spring biases said contact surface against the inner wall of the inlet housing member, and wherein said control member pivots in position about contact between said contact surface and the inner wall of the inlet housing member, in response to liquid pressure within the inlet chamber acting on the closure members.

12. A flow divider according to claim 11, wherein the spring contacts the spring arm at a location that is laterally spaced from the contact surface, towards the first and second closure members.

13. A flow divider according to claim 1, wherein said housing comprises an inlet housing member, an outlet housing member, and a divider wall member; said divider wall member being located between the inlet housing member and the outlet housing member; said inlet housing member including an inlet cavity opening towards the divider wall member, and an inlet passage leading into the inlet cavity; said inlet cavity and said divider wall member together defining said inlet chamber; said divider wall member including said first orifice and said second orifice; and said outlet housing member including said first outlet and said second outlet.

14. A flow divider according to claim 13, wherein the rigid connection includes a pivot bar and a spring arm secured to the pivot bar and projecting laterally from the pivot bar, and wherein said spring includes a first end which contacts the spring arm and a fixed in position second end, contact between the first end of the spring and the spring arm serving to operatively connect the spring to the rigid connection.

15. A flow divider according to claim 14, wherein the divider wall member has a side directed towards the outlet housing member and said side includes a groove in which the pivot bar is at least partially located.

16. A flow divider according to claim 13, comprising a first seal ring positioned between the inlet housing member and the divider wall member and a second seal ring between the divider wall member and the outlet housing member, each said seal ring surrounding an area which includes the first and second orifices, and in the case of the second seal ring further includes the first and second closure members and the rigid connection.

17. A flow divider according to claim 16, wherein the divider wall member has a side directed towards the outlet housing member and said side includes a groove in which the pivot bar is at least partially located.

18. A flow divider according to claim 13, wherein one of said inlet housing member and said outlet housing member includes a recess in which the divider wall member is at least partially received; said divider wall member including a surface directed towards the other of said inlet housing member and said outlet housing member, and a seal groove at the periphery of the divider wall member; and said flow divider including a seal ring in the seal groove which contacts surface portions of the inlet housing member, the outlet housing member and the divider wall member.

19. A flow divider according to claim 18, wherein the seal groove is partially within the divider wall member and partially within the housing member that includes the recess, said seal ring contacting a surface portion of such housing member and a surface portion of the divider wall member, within the seal groove, and also contacting a surface portion of the other housing member.

20. A flow divider according to claim 1, wherein the rigid connection includes an elongated pivot bar, first and second parallel support arms extending laterally from the pivot bar, and a spring arm connected to the pivot bar and extending laterally from said pivot bar, between the first and second support arms; said first closure member being at an outer end of the first support arm and the second closure member being at an outer end of the second support arm; said spring arm including an outer end portion that is spaced inwardly towards the pivot bar from said first closure member and said second closure member; said housing including a channel in which the pivot bar is received, and a spring cavity confronting the outer end portion of the spring arm; and said spring being within said spring cavity and including a first end which contacts the outer end portion of the spring arm and a second end which contacts a base surface in the spring cavity, said spring cavity serving to fix the second end of the spring in position.

21. A fuel system for a vehicle, comprising:
a first fuel storage tank;
a second fuel storage tank;
an engine having a pump;
a combiner including first and second inlets;
a first delivery conduit extending from the first tank to the first inlet;
a second delivery conduit extending from the second tank to the second inlet;
a third delivery conduit extending from the outlet of the combiner to the pump;
a flow divider including an inlet, a first outlet and a second outlet;
a first return conduit extending from the engine to the inlet of the flow divider;
a second return conduit extending from the first outlet of the flow divider to the first tank;
a third return conduit extending from the second outlet of the flow divider to the second tank;
said flow divider including an inlet portion and an outlet portion separated by a divider wall;
said inlet portion including said inlet and an inlet chamber which is bounded by the divider wall, said divider wall including a first orifice aligned with the first outlet and a second orifice aligned with the second outlet;
a first closure member in the first outlet, and a second closure member in the second outlet;
a pivot member to which both closure members are rigidly connected;
a spring operatively connected to the pivot member, for rotating the pivot member in a direction biasing the first closure member towards the first orifice and the second closure member towards the second orifice, and
wherein fuel pressure within the inlet chamber acts on the closure members and swings them away from the orifices, to allow fuel to flow through the orifices from the inlet chamber to the first and second outlets, and then through the second and third return conduits back to the first and second tanks, respectively.

22. A fuel system according to claim 21, wherein the pivot member includes a spring arm secured to a pivot shaft and projecting outwardly from the pivot shaft, and wherein said spring includes a first end which contacts the spring arm and a fixed in position second end, contact between the first end of the spring and the spring arm serving to operatively connect the spring to the pivot member.

23. A fuel system according to claim 22, wherein the outlet portion of the flow divider includes a spring cavity located generally between the first outlet and the second outlet, and wherein the second end of the spring is located within said spring cavity.

* * * * *